(12) United States Patent
Sharma et al.

(10) Patent No.: US 7,123,623 B2
(45) Date of Patent: Oct. 17, 2006

(54) HIGH-SPEED PARALLEL CROSS BAR SWITCH

(75) Inventors: Vishal Sharma, San Jose, CA (US);
Saadeddine Mneimneh, Dallas, TX (US)

(73) Assignee: Tellabs Operations, Inc., Naperville, IL (US)

( * ) Notice: Subject to any disclaimer, the term of this patent is extended or adjusted under 35 U.S.C. 154(b) by 852 days.

(21) Appl. No.: 09/998,523

(22) Filed: Nov. 29, 2001

(65) Prior Publication Data

US 2002/0064154 A1 May 30, 2002

Related U.S. Application Data

(60) Provisional application No. 60/250,298, filed on Nov. 29, 2000.

(51) Int. Cl.
*H04L 12/56* (2006.01)
(52) U.S. Cl. .................. 370/413; 370/358; 370/370; 370/380
(58) Field of Classification Search ............... 370/413, 370/414, 415, 416, 417, 418, 358, 370, 380
See application file for complete search history.

(56) References Cited

U.S. PATENT DOCUMENTS

| | | | | |
|---|---|---|---|---|
| 5,157,654 A | * | 10/1992 | Cisneros | ............... 370/414 |
| 5,253,251 A | * | 10/1993 | Aramaki | ............... 370/394 |
| 5,367,520 A | * | 11/1994 | Cordell | ............ 370/395.71 |
| 6,085,094 A | * | 7/2000 | Vasudevan et al. | ......... 455/447 |
| 6,137,795 A | * | 10/2000 | Tominaga et al. | .......... 370/375 |
| 6,147,969 A | * | 11/2000 | Benmohamed et al. | ..... 370/230 |
| 6,788,689 B1 | * | 9/2004 | Turner et al. | ............ 370/395.4 |
| 2002/0031127 A1 | * | 3/2002 | Parruck et al. | .......... 370/395.1 |
| 2002/0145974 A1 | * | 10/2002 | Saidi et al. | .................. 370/230 |

OTHER PUBLICATIONS

Iyer, Sundar et al.; Analysis of a packet switch with memories running slower than the line-rate; Computer Systems Laboratory, Stanford University.

Mneimneh, Saadeddine S. et al.; On Scheduling Using Parallel Input-Output Queued Crossbar Switches With No Speedup; Massachusetts Institute of Technology and Jasmine Networks, Inc.; pp. 1-17.

Chaney, Tom J. et al.; Design of a Gigabit ATM Switch; Washington University; Feb. 5, 1996.

Krishna, Pattabhiraman et al.; On the Speedup Required for Work-Conserving Crossbar Switches; IEEE Journal on Selected Areas in Communications; vol. 17, No. 6, Jun. 1999; pp. 1057-1066.

Chuang, Shang-Tse; Matching Output Queueing with a Combined Input/Output-Queued Switch; IEEE Journal on Selected Areas in Communications; vol. 17, No. 6, Jun. 1999; pp. 1030-1039.

(Continued)

*Primary Examiner*—Chau Nguyen
*Assistant Examiner*—Nguyen H. Ngo
(74) *Attorney, Agent, or Firm*—Baker Botts L.L.P.

(57) ABSTRACT

Low speed switches operated under the common control of a global scheduler can be used to switch high speed data while preserving packet ordering if the incoming packets are queued in a temporal order. By operating several low speed switches in parallel, a high-speed switching capacity can be realized.

14 Claims, 5 Drawing Sheets

OTHER PUBLICATIONS

Charny, A., et al., "Algorithms for providing bandwidth and delay guarantees in input buffered crossbar switches with speedup," in Proc. Int'l. Workshop Quality of Service, Napa Valley, CA, May 1998.

A Method for Generalized Inverse Multiplexing of IP Flows Across a Switch/Router, Tellabs Patent Submission, PB 00 0011, Jan. 2000, Currently under Patent attorney action.

* cited by examiner

-PRIOR ART-

A POSSIBLE REALIZATION FOR A DEMULTIPLEXER Di

HIGH-SPEED PARALLEL CROSS BAR SWITCH

RELATED APPLICATION

This application claims the benefit of U.S. Provisional Application No. 60/250,298 filed Nov. 29, 2000.

FIELD OF THE INVENTION

This invention relates to data switching systems. In particular, this invention relates to a method and apparatus for providing a relatively high-speed switching capability using several relatively low speed switching systems operated in parallel.

BACKGROUND OF THE INVENTION

The Internet and its ever-increasing use, by a rapidly growing number of users continues to test the limits of switching equipment. Data networks that comprise the Internet are required to carry greater amounts of data, faster and faster. As a result, the data switches from which the networks are assembled are becoming increasingly complex and expensive.

Internet protocol (IP) data networks now routinely carry data at rates that are well over 1 gigabit per second. Switching equipment that is fast enough to handle such data rates, needs to be able to decode, among other things, address information embedded within an IP data packet and then, route packets to the appropriate destination. In managing the growth of data networks that carry high-speed data, a switching system architecture that is able to switch high-speed data at relatively low cost would provide a significant advantage to network service providers, in part, by providing them with the equipment to maintain service levels albeit at a relatively low cost.

The cross-bar switch is a well-known data switch. A cross bar switch is a switching system with some number of inputs and a comparable number of outputs. A connection between an input port and one of the output ports is established using switching techniques that functionally couple one of the inputs to one of the outputs much like a relay matrix.

Cross bar switching system technology is well known and such switching systems are relatively inexpensive to manufacture. A method and apparatus by which several of such systems could be operated in parallel to provide enhanced switching speeds would be an improvement over the prior art.

DETAILED DESCRIPTION OF THE PREFERRED EMBODIMENT

Figure 1:
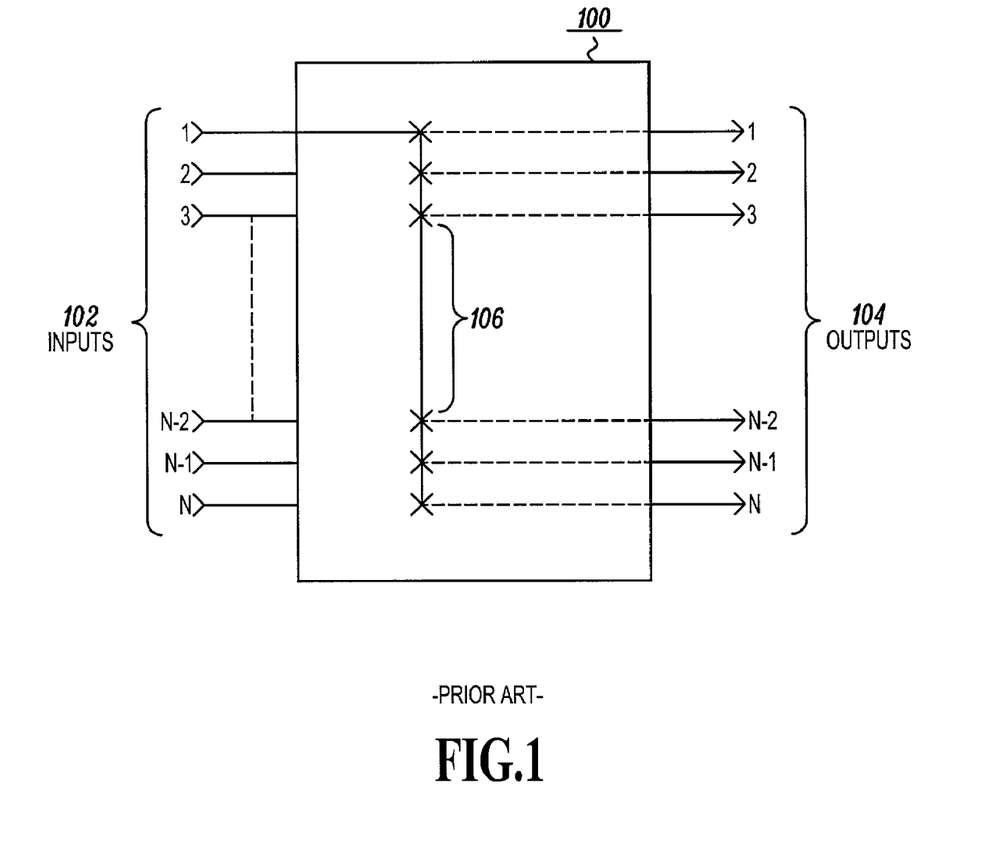
FIG. 1 shows a simplified schematic representation of the functionality of a prior art cross bar switch.

FIG. 1 shows a simplified schematic diagram of a prior art cross bar switch 100. The cross bar switch receives data (not shown) from a data source (not shown) at one or more input terminals 102. Data at an input 102, such as input 102-1, can be routed to any one of the outputs 104 by way of relays or relay equivalents (typically comprised of switching logic devices) 106 by which data is synchronously clocked from an input 102 to an output 104. By controlling the appropriate relay or relay equivalent, data from a source can be redirected to a destination coupled to one or more of the output ports 104.

Those skilled in the art understand the operation of a cross bar switch, a detailed understanding of which is not required for purposes of this disclosure. Cross bar switches are readily available from manufacturers such as Lucent Technologies, Inc., Nortel Networks, Inc., PMC Sierra Inc., and Advanced Micro Circuits Inc.(AMCC) as those skilled in the art will recognize.

Put simply, a cross bar switch is a switching system that synchronously routes input data from an input port (or terminal) to an output port (or terminal) using an electronic switching matrix by which data on one of several inputs can be electronically connected to any one of several outputs. The data capacity of a cross bar switch (the rate at which data can be switched) is limited to the speed at which the switching circuitry of the cross bar switch matrix can clock data from an input to an output, including the time required to set up the various circuits required to establish a path from an input to an output. Increasing the rate at which data can traverse a cross bar switch requires faster switching circuitry, to which there is both a physical limit and an economic limit. Increasing the speed of a cross bar switch thus requires faster and more costly electronics. At some data rate, further speed increases become technically impossible due to the physical limitations of the switching electronics, as well as the overhead associated with just setting up switching paths through the cross bar switch. The process of setting up or provisioning a cross bar switch is usually performed by a computer or processor, often called a scheduler,(not shown in FIG. 1). Provisioning a cross bar switch takes a finite amount of time.

While there are both physical and economic limitations to the rate at which data can be switched through a cross bar switch, using the methods and structures disclosed herein, there may be virtually no limit to the rate at which data can be switched through several cross bar switches, if they are properly supported to operate in parallel by directing data packets to the switch that can best handle the data. We call the use of multiple cross bar switches operated in parallel a super switch. In the preferred embodiment, input data packets at an input port to the super switch are routed to a particular cross bar switch of possibly several switches, that can best assure that the input ordering (sequencing) of data packets will be preserved by the super switch. By appropriately configuring circuitry to direct high-speed data into multiple cross bar switches it is possible to perform the operation of a single, very high speed cross bar switch albeit using several lower speed, lower cost switches, without mis-ordering data packets that are routed through the separate switch matrices.

Figure 2:
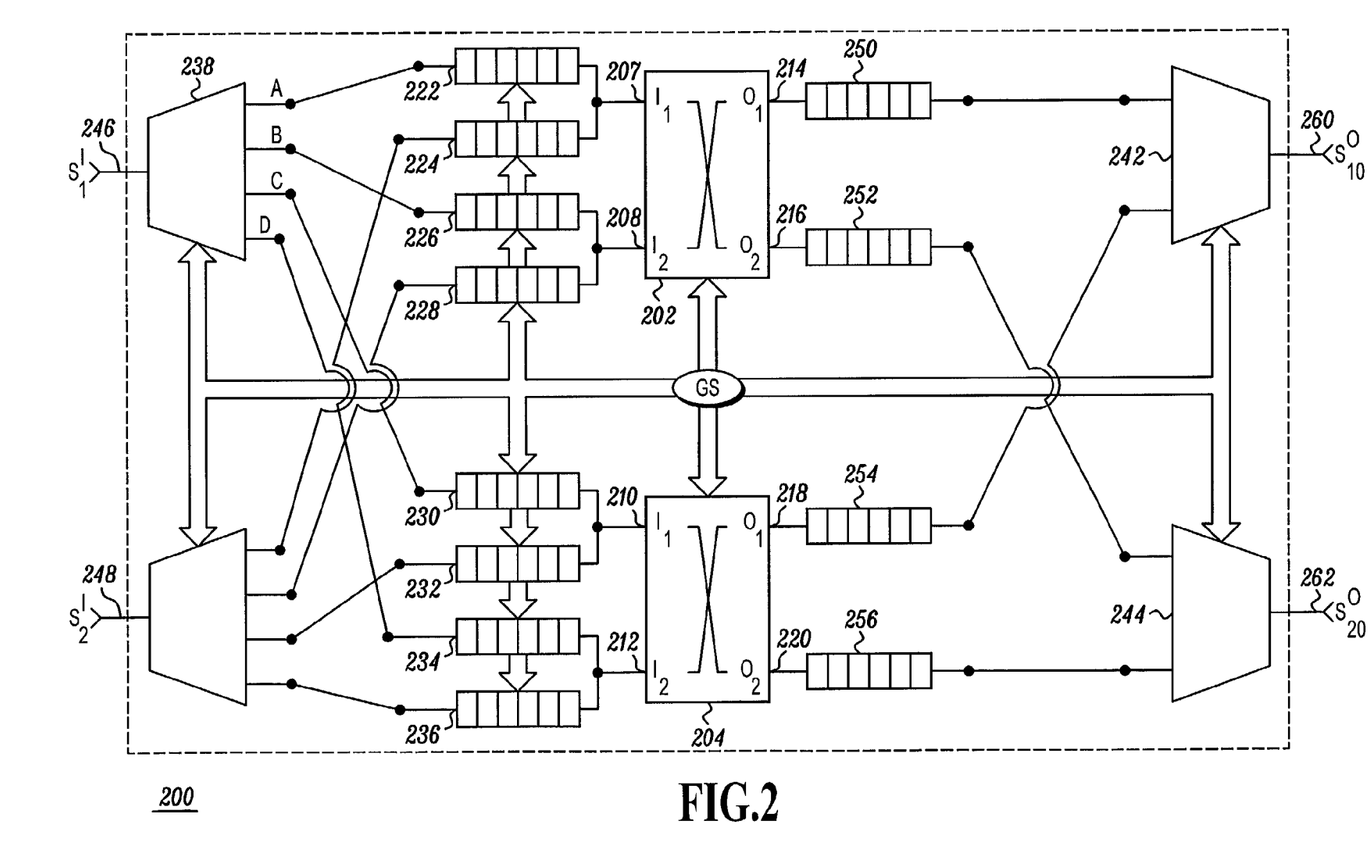
FIG. 2 shows a more detailed depiction of the functional elements of a switching system comprised of several parallel cross bar switches and a global scheduler.

FIG. 2 shows a simplified block diagram of a super switch 200 implemented using two separate cross bar switches 202 and 204 operated in parallel. The separate cross bar switches are considered to be configured in parallel, (also considered as parallel-coupled or operated in parallel) as they are operated, under the common control of a global scheduler 206. Data is sent into both cross bars 202 and 204 in parallel, i.e., not serially. The first cross bar switch 202 has two inputs ports (also referred to as terminals) identified by reference numerals 207 and 208 into which data packets to be switched within the cross bar 202 (so they can be routed to a destination) are ported (or coupled). The first cross bar switch 202 also has two output ports, identified by reference numerals 214 and 216, to which output data buffers 250 and 252 are coupled. The output data buffers 250 and 252 receive data from the output ports 214 and 216. The output data buffers 250 and 252 temporarily store data from the output ports 214 and 216 until it can be read by the super switch output multiplexers 242 and 244, the outputs of which are coupled to the super switch outputs $S^O10$ and $S^O20$.

The second cross bar switch 204 has inputs identified by reference numerals 210 and 212 and its outputs are identified by reference numerals 218 and 220. It also uses two output data buffers or data queues 254 and 256 the inputs of which are coupled to the cross bar outputs 218 and 220. The data buffers outputs are also coupled to the multiplexers 242 and 244 as shown.

Those skilled in the art will recognize that a cross bar switch is capable of routing input data at one of its input ports to one of the switch outputs. With respect to FIG. 1, data input to the data port 102-1 can be routed by a switch matrix 106 (not shown in detail) to any of the outputs 104-1–104-N. With respect to the system shown in FIG. 2, an input data stream (either a serial bit stream or parallel data bytes, depending upon the switch architecture) at input port 207 can be routed to either output 214 or 216 by way of a switch matrix (not shown) within the cross bar switch 202. Similarly, input data at input port 208 can be routed to either output 214 or 216.

Cross bar switch 204 operates identically to cross bar switch 202. Data at input port 210 can be switched to either output 218 or 220. Data at input 212 can be switched to either output 218 or 220 as well.

Routing the different data packets of a single data flow (which could be made up of numerous individual data packets) through different cross bar switching systems that comprise a super switch is fraught with potential data packet sequencing problems. The solution to the problem of maintaining data flow packet sequencing when a data flow is routed through a super switch requires a careful, cross bar switching system coordination methodology and scheduling mechanism, as disclosed herein. Data packets of a data flow will usually be ordered and preserving the packet ordering may be of critical importance, if, for instance, the data packets represent voice samples of a voice communication or telephone call or a real-time web transaction. Re-ordering or mis-ordering data packets that comprise a portion of a conversation can have a number of adverse consequences. Preserving the order of data packets of a data flow can be critically important—yet difficult to achieve when data packets of a data flow can be routed to different switching systems. Routing one packet to one switch with a long input data buffer (also known as a data queue) and then routing a subsequent packet to a different switch with perhaps a shorter input data buffer (or data queue) can almost guarantee that the data packets will emerge from the super switch improperly ordered. In many switching applications, preserving packet order is of critical importance, since it affects adversely the performance of the Transmission Control Protocol (TCP), one of the most commonly used protocols by current applications on the Internet. This is because, when the extent of reordering is high, the TCP protocol assumes that packets have been lost in the network, and cuts its rate in half and gradually starts to increase its rate. If this happens often enough, the achievable throughput for an application may be clamped to half of what it could achieve in the absence of mis-ordering.

Both cross bar switches 202 and 204 operate under the control of the global scheduler 206, a function of which is to configure the switch matrices (not shown) within each of the cross bar switches 202 and 204 to appropriately set up pathways between the inputs and outputs of each switch so as to be able to route data packets at the switch inputs to the proper switch outputs. In other words, the global scheduler acts to set up the cross bar switches, the input data demultiplexers 238, 240 and the input data buffers or data queues 222, 224, 226, 228, 230, 232, 234 and 236 so as to connect an input port of the super switch 246, 248 to a particular output port 260, 262 so that data at a particular input port is carried to the switch output port 260, 262 from which a pathway (not shown) exists to the ultimate destination for the data packets, for every cell slot, wherein a cell slot is considered the length of time it takes to transmit a data cell or data packet on a link operating at a certain data rate.

In the preferred embodiment, the global scheduler 206 is a processor or processor complex, operatively coupled to each of the cross bar switches 202 and 204. Examples of processors that could be used for the global scheduler 206 include customer application specific integrate circuits, suitably programmed microprocessors and microcontrollers as well as more-powerful machines such as one or more work stations or general purpose main frame computers, all of which are well-known to those of ordinary skill in computer art.

From FIG. 2 it can be seen that the global scheduler 206 is also operatively coupled to the input demultiplexers 238, 240, the input data buffers 222, 224, 226, 228, 230, 232, 234 and 236 and output data multiplexers. Signals from the global scheduler 206 are preferably carried over a bus, such as an address, data and control bus commonly found on microprocessors and by which control signals can be sent to and received from the peripheral equipment to which the bus is coupled in order to set up the circuits, including the switching matrices of the cross bar switches to create a pathway from an input port to an output port, for each switch. How a cross bar switch is set up to connect an input to an output will depend upon the identity (i.e. the manufacturer) of the particular cross bar switch being used, and in that regard, configuration and control of the cross bar switches is a design choice.

As set forth above, the global scheduler 206 is also coupled to other controlled elements depicted in FIG. 2, including the input buffers 222, 224, 226 and 228 and input buffers 230, 232, 234 and 236. The global scheduler is also operatively coupled to input demultiplexers 238 and 240 as well as output multiplexers 242 and 244.

As set forth above, appropriately using several (two or more) relatively low speed, low cost, n×n cross bar switches in parallel, enables a collection of such switches and ancillary circuits that are collectively referred to as a "super switch" 200 to route individual data packets of the several data flows $f_{1j}$–$f_{nj}$, $j=1, \ldots, n$, that make up each of the data streams $S_1$–$S_n$ that are input into each input port $I_1$–$I_n$ of the super switch. For the purpose of this disclosure, a data flow $f_{i,j}$ is defined as the sequence of cells that arrives at an input i of the super switch destined for an output j of the super switch. In order to be able to properly route each of the data packets of each data flow that comprises each data stream and keep the order of the packets in the incoming streams intact through the super switch 200, the global scheduler (or equivalent functionality thereof) needs to set up the data packet routing to the particular cross bar switch input queues according to some well-defined algorithms, one of which, for example, may require the scheduler to route data depending on the amount of data pending in each of the cross bar switch input port data buffers (also known as data queues).

Figure 3:
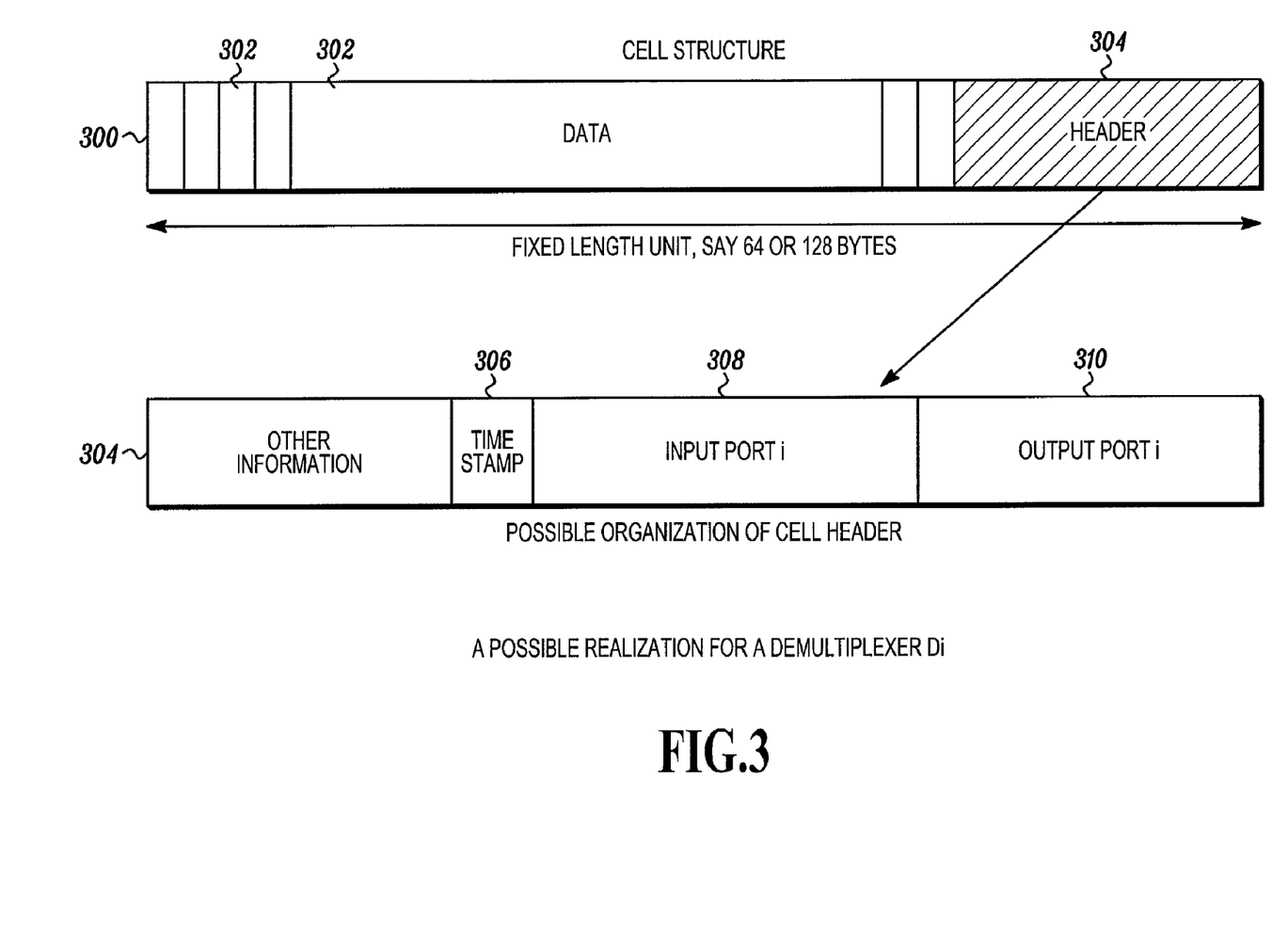
FIG. 3 shows a simplified representation of the structure and organization of a data cell for the switching system as it is depicted in FIG. 2.

The global scheduler 206 operates to control input data packet routing (data packet routing by the input demultiplexers 238 and 240) using data fields embedded in the data packet headers as shown in FIG. 3. A data cell 300 includes a number of data bytes 302 to which is appended by other circuitry (not shown) a header 304 that includes several pieces of information required to route the cell 300 through the super switch 200 while preserving packet ordering. Data packet ordering of the input flows $f_{1j}$–$f_{nj}$ where j=1–n,. to the super switch is preserved at the output of the switch if three rules are adhered to. First, data packets of the input flows $f_{1j}$–$f_{nj}$ for j=1–n, are selectively routed to an input data buffer (data queue) for a switch input port (207, 208, 210, 212) having the shortest data packet pendant time (or smallest amount of stored, pending data) and from which the cross bar switch will route data to an appropriate output port (by provisioning the switch matrices within the cross bar switches) as indicated by the input 308 and output 310 address/port fields of the header 304. Secondly, data is read from the buffer into which the packets were read according to a time stamp 306 in the header such that the "oldest" data cells of a data flow in a buffer are read from that buffer first. Third, the global scheduler computes a matching (described below) during each cell slot and applies the matching to all cross bar switches.

FIG. 2 illustrates a possible coupling of the demultiplexers to the input data queues of the parallel switches. It can be seen in FIG. 2, that one output (A) of the data demultiplexer 238 is coupled to the input of data queue 222. The output of data queue 222 is in turn coupled to the input port 207 of the first cross bar switch. Similarly, output B of the demultiplexer 238 is coupled to input data queue 226, the output of which is coupled to cross bar 202 input port 208. Output C of demultiplexer 238 is coupled to data queue 230, the output of which is coupled to the input port 210 of cross bar switch 204 while output D is coupled to the input data buffer 234 for cross bar input port 234.

It can be seen in FIG. 2 that the 1×4 data demultiplexer 238 can route data in the input stream $S^I_1$, to any one of the four input ports 207, 208, 210 and 212 through the associated data buffers 222, 226, 230 and 234 respectively. Similarly, the 1×4 data demultiplexer 240 can route data in the input stream $S^I_2$, to any one of the four input ports 207, 208, 210 and 212 through the associated data buffers 224, 228, 232 and 236 respectively. If an input port 207, 208, 210 or 212 is coupled to a particular output port 214, 216, 218 or 220 via the configuration of the switch matrix within the corresponding cross bar switch 202 or 204, routing a data packet from a particular input 246 of 248 of the super switch 200 to a particular output 260 or 262 becomes a matter of directing the data packet from a particular input (246 or 248) to a particular input buffer 222, 224, 226, 228, 230, 232, 234 or 236, which feeds an input port 207, 208, 210 or 212 that is set up with a switch point matrix to route data to the desired output (260 or 262) possibly including an output buffer 250, 252, 254 or 256.

In provisioning (programming or setting up) the switch matrices of the cross bar switches 202 and 204, the switch matrix for each switch is programmed to route a particular input, say 207, to a particular output 216 of each switch. Once a particular input is provisioned (programmed or set up) to route its input data to a particular output, any data input to that input port will be routed to the same output port. In order to be able to route data packets at either of the super switch input ports 246 and 248 to either of the two output ports 260 and 262, the super switch must be capable of routing data at any input to any output. Accordingly, each input port 207, 208, 210 and 212 of each cross bar switch has two input buffers, one of which at each input port 207, 208, 210 and 212 is coupled to one output of the 1×4 demultiplexer. Those skilled in the art will recognize that the topology shown in FIG. 2 enables any data at either input 246 or 248 to be routed to any input 207, 208, 210 and 212 of either switch 202 and 204.

For purposes of illustration of the embodiment shown in FIG. 2, for a given cell slot, assume for example that input 207 is routed to output 216; assume further that input 208 is routed to output 214; assume still further that input 210 is routed to output 218 and that input 212 is also routed to output 218. In order to route a data cell, such as the data cell 300 shown in FIG. 3, from super switch input 248 to super switch output 260, a switching pathway between these two points through the super switch must be identified and/or configured. Using the foregoing assumptions as to how the cross bar switches are configured, routing a data packet from super switch input 248 to super switch output 260 can be accomplished using either switch 202 or switch 204. For a subsequent cell slot, the switches 202 and 204 might need to be completely reconfigured. Note that in certain applications, such as in the design of high-speed switches and routers, the parallel crossbars within the superswitch might be reconfigured during each time slot, since the dynamic and variable nature of the data traffic arriving at the inputs of the superswitch makes such a reconfiguration necessary for the proper operation of the super switch. At the same time, in certain applications, such as in the design of optical switches or optical routers, the reconfiguration of the parallel crossbars may be required (and therefore done) only periodically. This is because the operation of the optical circuitry is slow and may require multiple cells slots to reconfigure. In such a case, the scheduler in the superswitch may direct traffic through the optical switch in such a fashion so as to require that the parallel crossbars comprising the internals of the optical superswitch only be configured every few cell slots. It should also be noted that the traffic passing through an optical switch is often comprised of data streams that remain fairly stable over long lengths of time. (This is due to traffic aggregation that invariably occurs at the edge switches of the network, before the traffic gets to the optical switch.) As a result, the parallel crossbar switches do not need to be reconfigured every cell slot, as explained above.

If a data packet at input 248 is routed to super switch output 260 through input 208 of cross bar switch 202, a data packet at input 248 needs to be routed using demultiplexer 240 to input buffer 228 from which the data packet can be transferred into input 208 of cross bar switch 202. Because input 208 of switch 202 was configured during a particular cell slot to route its input data to output 214, data that is clocked into the input 208 from buffer 228 will be delivered to output 214 from which it is transferred into the output buffer 250 and then to super switch output 260 through the multiplexer 242.

Similarly, an input data packet at super switch input 248 can be routed to super switch output 260 via switch 204, if the input data packet at input 248 is routed to either input data buffer 232 (which is coupled to input 210 of switch 204)

or data buffer 236 (which is coupled to input 212 of switch 204) because either one of inputs 210 and 212 of switch 204 can be configured, during a particular cell slot, to route data to output 218, the output of which is buffered by data buffer 254, the output of which is also coupled to multiplexer 242.

Maintaining the ordering of data cells through the cross bar switches is problematic however, if the temporal ordering of the cells stored in the input buffers 222–236 is not considered. By way of example, consider two consecutive data packets of a data stream S at input 248. If packet 1 precedes packet 2 in the stream S, routing packet 1 to an input buffer (222, 224, 226 228, 230, 232, 234 or 236) different than an input buffer to which packet 2 is routed can cause packet 2 to be routed out of the super switch 200 ahead of packet 1, even though packet 1 arrived at the super switch ahead of packet 2. Buffer contents can cause data packets of a data stream to become mis-ordered unless the distribution of packets of the same stream into the buffers is performed so as to retain their ordering through the superswitch In order to preserve the order of data packets as they are received at the super switch, 200, the demultiplexer 238 or 240 directs each data cell of a data stream to a data buffer (222–236) having the shortest (or smallest) data queue, during the time slot of a data cell's arrival at the super switch 200. The output of the buffer into which a data cell was directed by the demultiplexer is coupled to a cross bar input port that is routed to the appropriate output port under the control of the global scheduler. In sending data to the appropriate buffer with the smallest amount of data, and by a scheduling strategy described ahead (as compared to all other data buffers 222–236 that are to be routed to the same output) the global scheduler assures that the most recently routed data packets will arrive at the pertinent output port (214, 216, 218 or 220) after all other data packets destined for the same output port have already been switched thereto.

In the preferred embodiment, the input data buffers (also known as data queues) 222, 224, 226, 228, 230, 232, 234 and 236 are comprised of random access memory that is operated as first-in first-out (FIFO) buffers, the operation of which his well known to those skilled in the art. Data bytes of data cells 300 are transferred (or written and temporarily stored) from the demultiplexers 238, 240 into the FIFOs, where they are stored pending their delivery, at a later time, into an associated input port of an associated cross bar switch under the control of the global scheduler 206. As is well known, data is read from the FIFO in the order in which it was stored into the FIFO (the first data in is the first data out). The FIFO data buffers 222–236 provide an intermediate and temporary storage for data bytes (or bits) from the demultiplexers 238 and 240 until the associated cross bar switch is available to switch the data. Data is read from the FIFOs under the direction and control of the global scheduler, which reads the data cells 300 stored in the FIFOs according to the relative time stamp 306. By reading the time stamp 306 of a first cell in the FIFOs, the global scheduler 206 reads the oldest cell for each flow first, followed by successively less-old cells, thereby preserving the order in which cells of a data flow are switched.

Figure 5:
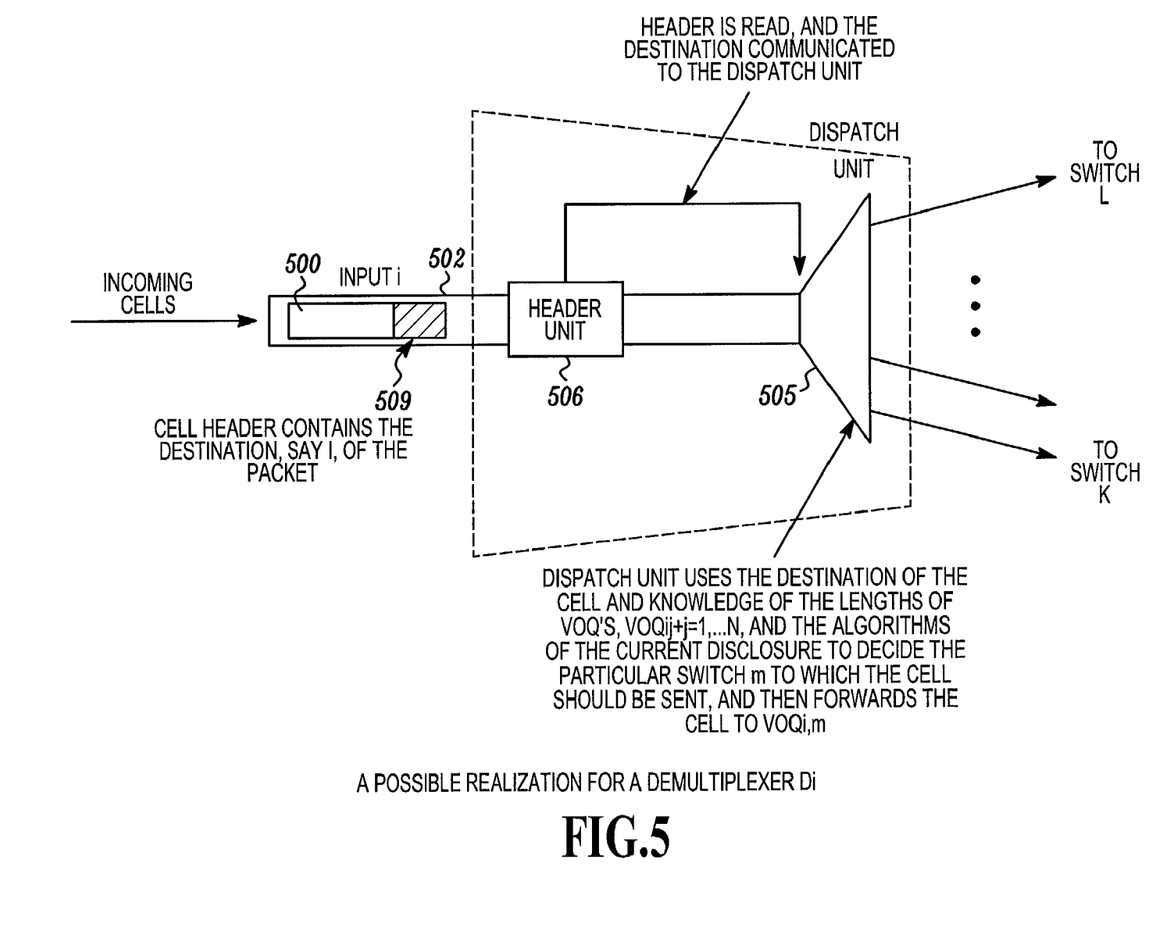
FIG. 5 shows a simplified block diagram of the operation of a data stream demultiplexer.

The demultiplexers 238 and 240 shown in FIG. 2 operate analogous to known 1-x-4 data demultiplexers. FIG. 5 shows a simplified representation of how the demultiplexers 238 and 240 operate to route data packets of data cells 300 to a particular input data buffer (queue).

FIG. 3 shows a simplified representation of a data cell or data packet 300. A data flow fij where i=1,2,j=1–2 for the embodiment shown in FIG. 2, input to one of the super switch inputs 246 or 248 would typically be comprised of numerous such cells 300. The cell 300 is comprised of data bytes 302 which are preceded by a header, which includes other data bytes 304.

The header 304 includes a super switch input port designator or address 308. The input port designator 308 identifies to the global scheduler the particular input port of the super switch 200 into which the cell 300 is to be sent. The output port data field 310 identifies the super switch output port 260, 262 to which the data cell is be switched. The fields of the header are appended to the data byes 302 using other circuitry, not shown.

In addition to the input port 308 and output port designators 310 of the header, the header 304 typically will include a time stamp field 306. The time stamp field identifies, among other things, either an absolute time or a relative time that the cell 300 arrived at the switching system 200.

The header 304, and the information it contains, are important to the global scheduler for the selective delivery of cells 300 to the different data buffers (222–236) into which the cells 300 are loaded under the control of the global scheduler 206. An objective of the invention is the ability to use multiple low speed cross bar switching systems configured to operate in parallel such that the data throughput of the super switch 200 is substantially greater than that which would be otherwise possible using a single cross bar switch.

In order to preserve the ordering of cells 300 in a flow f, which comprises a data stream S, the global scheduler 206 causes the selective delivery of data cells 300, of a data flow f of a stream S of several flows to an input (either 246 of 248). The cells 300 of the flow are then routed to a data buffer 222–236 that is coupled to a cross bar switch input port. The global scheduler 206 either knows from an external source (not shown), or is otherwise informed (using for example information in the header 304) of the particular output 260 or 262 of the superswitch 200 to which the incoming data cells 300 of a flow f must be routed to. In other words, as data cells arrive at the superswitch 200, the global scheduler either knows, determines, or is "told" the output of the super switch to which each cell must be routed to and from there, the cells are carried by other transmission media to their ultimate destination. Once the super switch output destination is known for each data cell, the global scheduler routes cells by examining data in the cell headers to determine the super switch destination and thereafter identify which input buffer the cell should be routed to.

It can be seen in FIG. 2 that each input 207, 208, 210 and 212 has two data buffers coupled to it. In particular, buffers 222 and 224 are coupled to input 207; buffers 226 and 228 are coupled to input 208; buffers 230 and 232 are coupled to input 210; buffers 234 and 236 are coupled to input 212. There are two buffers used at each input of the two cross bar switches, both of which have two outputs, in order to preserver the ordering of data packets in a data flow that is input to the two super switch inputs. Maintaining packet ordering is accomplished by the global scheduler's routing the incoming cells (or packets) 300, into an input buffer (for a particular input port 207, 208, 210 or 212), the contents of which are routed to a particular output port 214, 216, 218 or 220. Stated alternatively, the global scheduler performs the function of distributing input cells of input data flows of an input data stream across the various parallel-operating cross bar switches. The global scheduler distributes the input data to appropriate input data buffers, and computes a schedule or matching of cross bar switching system inputs to outputs during each cell slot, so as to maintain the temporal ordering of data packets of data flows of a data stream as they arrive at the super switch 200.

Each of the input buffers feeding a particular input of a cross bar switch 202, 204 must be designated to store cells intended for a particular output of the super switch. These input buffers are known as virtual output queues.

By way of example, input data buffer 222, which is coupled to input port 207, could be designated to store data cells that are to be routed (by the cross bar 202) to super switch output 262. In order to accomplish such a result, the cross bar 202 must then route data cells from input buffer 222 and which are input to the input port 207 to the output 216. In contrast, the input buffer 224, which is also coupled to input port 207, could be designated to store data cells that need to be routed to super switch output 260. When the data cells stored in buffer 224 are clocked into the cross bar switch 202 input port 207, the cross bar 202 must then be configured to route input port 207 to cross bar 202 output port 214 from which a connection (through buffer 250) exists to super switch output 260. The separate input data buffers 222, 224, 226, 228, 230, 232, 234 and 236 are paired at the inputs 207, 208, 210 and 212 because the super switch has two outputs, each of which accepts data from two different cross bars, each of which has two inputs and two outputs. The global scheduler checks data in the cell headers (or elsewhere) and determines from that data where the cell needs to go and thereafter selects which of the input buffers that dump into a cross bar input that is routed to the desired output, has the smallest amount of data cells pending queued for routing into a cross bar. As cells for a particular destination arrive, they are routed by the global scheduler into the buffer having the smallest amount of pending data and which is designated as storing cells for the destination to which the cell is supposed to be sent. Alternate embodiments of the invention that have more cross bars, each with more inputs and outputs would require an accompanying increase in the number of input data buffers.

The global scheduler computes a permutation mapping (also called a "schedule" or a "matching") during each cell slot (wherein a "cell slot" is considered to be the time length of a data cell or data packet) for each of the parallel crossbar switches in the super switch. The "matching" process, pairs or matches each input of a crossbar switch with a super switch output to which a cell should be transmitted from a super switch input during the cell slot time interval for which the matching is computed. During a cell slot time interval, the global scheduler computes only a single match of the cross bar inputs with super switch outputs and applies the same matching (of cross bar inputs to super switch outputs) in all of the k parallel crossbar switches of the super switch. In other words, the scheduler does not compute a matching independently for each parallel crossbar switch. Rather, it computes only one matching, and uses that to configure all of the parallel crossbar switches in an identical way. For brevity, we will call this scheduling technique "k-parallel scheduling." The global scheduler also does some bookkeeping for the demultiplexers at the inputs, and allows them to distribute the incoming cells among the k parallel crossbars of the super switch. The rule that the demultiplexer at an input i follows to route a cell destined for an output j of the super switch is the following. The demultiplexer forwards such a cell to a crossbar switch 1 that has the minimum number of cells in the data buffer that stores cells destined from input i to output j. We call this demultiplexing strategy minimum length demultiplexing."

By combining "minimum length demultiplexing" with "k-parallel scheduling," the global scheduler ensures that the k oldest cells of each flow f_i,j are always in distinct crossbar switches. This property also ensures that, at the end of each cell slot, for any output j of the super switch, the oldest cell destined for that output (if there is one) is always at the head of one of the output buffers in the k parallel crossbars that hold cells destined for output j. So as long as the multiplexer feeding output j of the super switch picks the cell from the head of the correct output buffer, the cells destined for output j will be picked in FIFO order, and thus transmitted in order. This guarantee is what allows the multiplexer responsible for output j of the super switch to always be able to read a cell (for transmission on output j), simply by looking at the heads of the k output data buffers (one each in each of the k crossbar switches comprising the super switch) that store data destined for output j.

In the preferred embodiment, the global scheduler reads an input port address 308 and an output port address 310 from the header 304 of each cell. By way of table look up, linked list or other index, the global scheduler configures the input demultiplexers 238, 240 to route the cell 300 to a particular input buffer (222–236) the output of which is coupled to a cross bar input (207–212) that is coupled to a particular cross bar output (214, 220) that is coupled to the output identified in the output port address field 310.

Figure 4:
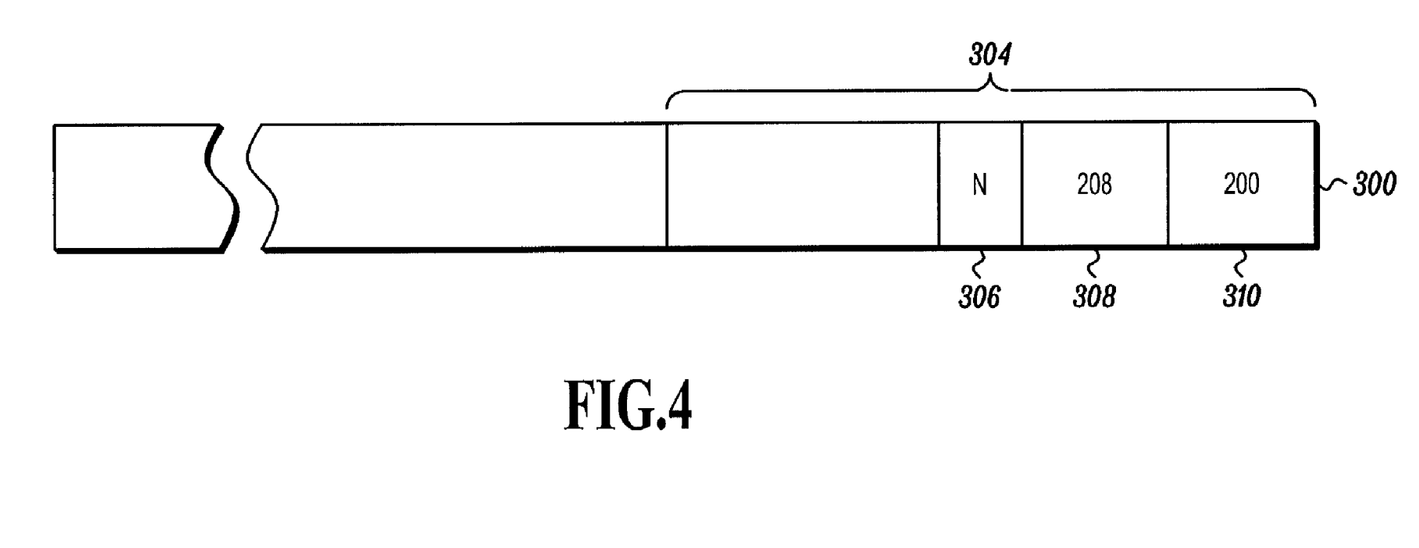
FIG. 4 shows another representation of a data cell.

By way of example and for purposes of illustration only, FIG. 4 shows a data cell 300 with a header 304 the output port address of which is 260 and the input port address of which is specified to be 248. The relative time of n=100 indicates either an absolute or relative time of the cell's arrival.

In this system, a time period is divided into slots, where a slot is the duration of time it takes to transmit a cell from an input buffer (222, 224, 226, 228, 230, 232, 234 and 236) of a crossbar switch (202, 204 respectively) through a switching pathway through a cross bar to an output buffer (250, 252, 254, 256). Thus, at the start of each cell slot (actually during the previous cell slot), the global scheduler 206 examines the information in the cells at the heads of all of the input queues at all of the parallel crossbars and computes a schedule. For each of the parallel crossbars, the schedule determines exactly which input (207 and 208; 210 and 212) of a given crossbar (202 and 204 respectively) should be coupled to which output (214 and 216; 218 and 220 respectively) of the corresponding crossbar, and, furthermore, which of the queues feeding an input of a crossbar gets to transmit a cell during the cell slots for which the schedule is being computed. In other words, a schedule may be viewed as a permutation mapping, which maps each input of a crossbar switch to a corresponding output.

The global scheduler 206 reads incoming address information in the header 304 of a data cell 300 and identifies from the header information the super switch input port to which the cell should be sent and the super switch output port to which the cell must be sent for each data cell and using the information in the cell header, the scheduler 206 sets up the demultiplexers to route the particular data cells to the appropriate input buffers 222–236. The global scheduler routes the data cells to the input port buffer that has the smallest amount of pending data. Stated alternatively, the global scheduler will route the cell 300 to the input data buffer having the least amount of pending data but which can be routed to the appropriate output port leading to the proper super switch output.

By routing the data cells to the data buffers having the shortest amount of queued or stored data, the global scheduler 206 can insure that the ordering of data packets in a flow that is part of a stream will be preserved by the appropriate cross bar switch through which the data cells are routed. After the cross bar switches 202 and 204 synchronously transfer data from the appropriate input through the appropriate output 214, 216, 218 and 220, the output data can optionally be stored in an output queue or output buffer 250, 252, 254 and 256 as shown in FIG. 2.

These output buffers 250, 252, 254 and 256 are also preferably random access memory configured to operate as a FIFO the output ports of which are coupled to output multiplexers 242 and 244 also under the control of the global scheduler.

The output multiplexers 242 and 244 are 2-X-1 multiplexers which also operate under the control of the global scheduler to read data from the output buffers 250, 252, 254, 256 in such fashion that the ordering of data packets of a particular flow that was input to the super switch 200 through either one of the inputs 246 and 248 is preserved when the data is read out of the switch from either one of or both of the output multiplexers 242 and 244.

FIG. 5 shows a diagram of the organization of demultiplexers 238 and 240 shown in FIG. 2. In FIG. 5, an input data cell 500 has a header 304 that is input to a cell header processor unit 506, a function of which is to read data fields 306, 308 and 310. Destination address field 310 data is used to identify the super switch output port 260 or 262 to which the cell is to be sent. The demultiplexers therefore perform an important task of routing data cells to the appropriate input data buffers.

By sending data packets of a data flow to one of several independently configured cross bar switches, any one of which can route data packets to an output, it is possible to route high-speed data using relatively low speed switching systems, much like several low speed parallel processors executing the same program or algorithm might outperform a single high-speed processor repeatedly executing an algorithm.

By way of illustration, and for completeness of the above description, we outline a couple of applications of the invention disclosed above.

One application is that the present invention enables the construction of switches with speedup, using simple crossbar switches operating in parallel, none of which requires any speedup. (The speedup of a switch is defined as the factor by which the operation of the crossbar fabric of the switch is speeded up relative to the speed of operation of the inputs of the crossbar switch.) In other words, using the current invention, switches whose fabrics require a speedup greater than 2, relative to their line rates may be realized using the current invention, by using (in parallel) only switches that need operate no faster than the line rate. (Observe in FIG. 2, that none of the components in the superswitch—the demultiplexers, the input buffers, the crossbar fabrics, the output buffers, and the multiplexers—need to operate any faster than the rate at which data arrives at either input of the superswitch.)

Another application is that the current invention enables the construction of switches whose line rate is some multiple of the speed at which the internal components of the superswitch itself operate. In other words, using the current invention, it is possible to put several crossbar switches in parallel and build a switch whose aggregate line rate is some multiple of the rate at which any of the component crossbar switches operates. This is especially useful when DWDM (dense wavelength division multiplexing) capabilities can allow line rates to easily exceed the rates that are currently viable using high-speed electronic fabrics.

Of course the above applications are illustrative, and many other applications of the above invention are possible, and may become apparent to those of ordinary skill in the art.

What is claimed is:

1. A data switch comprising:
   a plurality of cross bar switches, each cross bar switch having a plurality of switch input ports and a plurality of switch output ports, each switch input port of each cross bar switch being operatively coupled to and associated with:
   a plurality of input data queues, each input data queue having an input port capable of receiving data packets, each of said input data queues also having an output port coupled to a corresponding switch input port of a corresponding cross bar switch;
   a plurality of data demultiplexers, each data demultiplexer having:
   a data input port at which a data stream S is received, and each demultiplexer having a plurality of data output ports each of which is coupled to a separate one of the input data queues associated with each corresponding cross bar switch input port;
   wherein each data demultiplexer directs each data packet of the respective data stream S to a particular input data queue having a smallest amount of queued data packets;
   a global scheduler operatively coupled to said data demultiplexers and to each of said data input data queues, said global scheduler controlling the routing of data from said plurality of switch input ports to said plurality of switch output ports.

2. A high-speed data switch comprising:
   a plurality of cross bar switches, each cross bar switch having a plurality of switch input ports and a plurality of switch output ports, each switch input port of each cross bar switch being operatively coupled to and associated with:
   a plurality of input data queues, each associated input data queue having an input port capable of receiving data packets, each of said data queues also having an output port coupled to a corresponding switch input port of a corresponding cross bar switch;
   a plurality of data demultiplexers, each data demultiplexer having:
   a data input port at which a data stream S is received, and each demultiplexer having a plurality of data output ports each of which is coupled to a separate one of said plurality of input data queues associated with each corresponding switch input port of each corresponding cross bar switch;
   wherein each data demultiplexer directs each data packet of the respective data stream S to a particular input data queue having a smallest amount of queued data packets;
   a global scheduler means, operatively coupled to said data demultiplexers and to said data input data queues, for:
   examining cells at the heads of the data demultiplexers; and
   determining from data in said cells which switch input port of a cross bar switch should be coupled to a particular switch output port of the cross bar switch.

3. A high-speed data switch comprising:
a plurality of cross bar switches, each cross bar switch having a plurality of switch input ports and a plurality of switch output ports, each switch input port of each cross bar switch being operatively coupled to and associated with:
  a plurality of input data queues, each input data queue having an input port capable of selectively receiving data packets from a data stream S, each of said data queues also having an output port coupled to switch output port of a corresponding cross bar switch;
  a plurality of data demultiplexers, each data demultiplexer having:
    a data input port at which said data stream S is received, and each demultiplexer having a plurality of data output ports each of which is coupled to a separate one of said plurality of input data queues associated with each corresponding cross bar switch;
    wherein each data demultiplexer directs each data packet of the respective data stream S to a particular input data queue having a smallest amount of queued data packets;
  a global scheduler means, operatively coupled to said data demultiplexers and to each of said data input data queues, for:
    examining cells at the heads of the data demultiplexers; and
    determining from data in said cells, which switch input port of a cross bar switch should be coupled to a particular switch output port of the corresponding cross bar switch; and
    configuring said data demultiplexers so as to route data cells of a particular incoming data flow to an appropriate input data queue.

4. A high-speed data switch comprising:
a plurality of cross bar switches, each cross bar switch having a plurality of switch input ports and a plurality of switch output ports, each switch input port of each cross bar switch being operatively coupled to and associated with:
  a plurality of input data queues, each input data queue having an input port capable of selectively receiving data packets from a data stream S, each of said data queues also having an output port coupled to a switch input port of a corresponding cross bar switch;
  a plurality of data demultiplexers, each data demultiplexer having:
    a data input port at which said data stream S is received, and each demultiplexer having a plurality of data output ports each of which is coupled to a separate one of said plurality of input data queues associated with each corresponding cross bar switch;
    wherein each data demultiplexer directs each data packet of the respective data stream S to a particular input data queue having a smallest amount of queued data packets;
  a scheduler means, operatively coupled to said data demultiplexers and to each of said data input data queues and to the cross bar switches, for:
    dividing the delivery of data packets of data flows of an input data stream that is input to said data switch across said plurality of cross bar switches and by computing a data packet schedule for each cross bar switch such that the temporal order of data packets into said data switch is maintained through each of the cross bar switches.

5. A data switch comprising:
a plurality of K cross bar switches, each cross bar switch having N switch input ports I and N switch output ports O, each of said cross bar switches routing data packets from one of said switch input ports to a switch output port, each switch input port of each of said K cross bar switches being coupled to:
  at least one of N parallel input data buffers B, each input data buffer B having an input port I and capable of receiving data packets of a data flow f in a stream S of data flows $f_1$ to $f_i$, each input data buffer further having an output port O coupled to a single one of said N switch input ports such that data packets in each of said N parallel input data buffers can be selectively routed into said corresponding cross bar switch;
each switch output port of each of said K cross bar switches being coupled to:
  an output buffer, each output buffer having an input port coupled to a single one of said N switch output ports of the corresponding cross bar switch and each output buffer having an output port from which data is transmitted to an output destination link;
N data demultiplexers, each data demultiplexer comprising:
  a data input port at which a data stream S is received; and
  N data output ports, each data output port being coupled to the input port I of a corresponding separate one of said input data buffers, each of said data demultiplexers selectively routing certain data packets in said stream S to at least one of the input data buffers;
  wherein each data demultiplexer directs each data packet of the respective data stream S to a particular input data buffer having a smallest amount of queued data packets;
a scheduler, operatively coupled to: said N data demultiplexers, the cross bar switches, and said N data input data buffers, said scheduler controlling the selective delivery of data packets into certain input data buffers and from said input data buffers into a corresponding cross bar switch.

6. A data switch comprising:
K cross bar switches, each of said K cross bar switches having N switch input ports I and N switch output ports O, each of said K cross bar switches routing data from one of the switch input ports $I_i$ to a switch output port $O_j$, each switch input port having coupled to it:
  N input data FIFO buffers, each input data FIFO buffer having an input to which a stream of data can be sent, each input data FIFO further having an output $B_o$ coupled to a single switch input port $I_j$ of said N switch input ports, each of said input data FIFO buffers storing data packets to be routed through the cross bar switches from switch input port $I_j$ a switch output port $O_k$;
  N data demultiplexers, each data demultiplexer having a data input port at which a data stream S comprised of a plurality of data flows $f_i$ is received, and further having N data output ports, each data output port of each demultiplexer being coupled to corresponding separate ones of the inputs of the input data FIFO buffers at each switch input port of each of said K cross bar switches, each of said data demultiplexers selectively routing data packets of predetermined flows $f_1$–$f_n$ to at least one input I of said input data FIFO buffers, wherein each data demultiplexer directs each data packet of the respective data stream S to a particular input data FIFO buffer having a smallest amount of queued data packets;

a scheduler, operatively coupled to said N data demultiplexers, said cross bar switches, and said N data input data FIFO buffers, said scheduler being capable of directing data packets of at least one data flow $f_i$ that is input to one of said N data demultiplexers to be routed to a particular input data FIFO buffer of a particular switch input port of a particular cross bar switch of said K cross bar switches.

7. The data switch of claim 6 wherein said N input data FIFO buffers are comprised of random access memory.

8. In a data switch comprised of a plurality k parallel crossbar data switches, operatively coupled together, a method of routing data packets of a data flow $f_i$ of a data stream $S_i$ of a plurality of streams $S_1$–$S_N$, to a destination through at least one parallel cross bar switch of a plurality of parallel cross bar switches, each crossbar switch having a plurality of N inputs from which data is routed through the switch to one of a plurality of N outputs from which data is routed to one of N destinations, each input of each cross bar switch capable of selectively receiving data packets that are stored in N parallel data buffers B into which data packets for each of said data streams $S_1$–$S_N$ are selectively written, said method comprising the steps of:

reading a header of a data packet in a data flow $f_1$ and determining from said header a destination to which said data packet from said data flow $f_1$ is to be sent through one of said parallel cross bar switches;

determining the amount of data stored in the data buffers for each of said k cross bar switches, which inputs of each of said k cross bar switches are designated to store cells for the particular output of each cross bar switch to which the data cell is to be routed;

routing at least some of the data packets of the flow $f_1$ to a data buffer B having the smallest amount of data waiting to be routed through its associated cross bar switch.

9. The method of claim 8 wherein said step of determining a destination to which a data packet is to be sent includes the step of reading from said header the identity of a data port of said cross bar switch to which at least some data packets are to be sent.

10. The method of claim 8 wherein said step of determining the amount of data stored in said N parallel data buffers includes the step of reading an address pointer value.

11. The method of claim 9 wherein said step of determining the amount of data stored in said N parallel data buffers includes the step of counting memory locations in which data is stored.

12. A switching system comprised of:

a plurality of parallel-coupled cross-bar switching systems, each parallel-coupled cross-bar switching system including a demultiplexer, a plurality of input queues, and a cross-bar switch, the demultiplexer operable to generate a plurality of outputs from an input stream, the demultiplexer operable to provide each of the plurality of outputs to a separate one of the plurality of input queues, each input queue being associated with a particular input to the cross-bar switch, wherein the demultiplexer directs each data packet of the input stream to a particular input queue having a smallest amount of queued data packets;

a global scheduler operatively coupled to and controlling the flow of data into each of said cross-bar switching systems.

13. A switching system comprised of:

a plurality of parallel-coupled cross bar switching systems, each having a plurality of cross bar inputs and cross bar outputs, each parallel-coupled cross-bar switching system including a demultiplexer, a plurality of input queues, and a cross-bar switch, the demultiplexer operable to generate a plurality of outputs from an input stream, the demultiplexer operable to provide each of the plurality of outputs to a separate one of the plurality of input queues, each input queue being associated with a particular input to the cross-bar switch, wherein the demultiplexer directs each data packet of the input stream to a particular input queue having a smallest amount of queued data packets;

a global scheduler coupled to said cross bar switching systems and controlling the flow of data through each of said cross bar switching systems by computing at least one match of cross bar switching inputs to cross bar switching outputs.

14. A switching system comprised of:

a plurality of parallel-coupled cross bar switching systems, each having a plurality of cross bar inputs and cross bar outputs, each parallel-coupled cross-bar switching system including a demultiplexer, a plurality of input queues, and a cross-bar switch, the demultiplexer operable to generate a plurality of outputs from an input stream, the demultiplexer operable to provide each of the plurality of outputs to a separate one of the plurality of input queues, each input queue being associated with a particular input to the cross-bar switch, wherein the demultiplexer directs each data packet of the input stream to a particular input queue having a smallest amount of queued data packets;

a global scheduler coupled to said cross bar switching systems and operatively controlling the flow of data through each of said cross bar switching systems by computing at least one match of cross bar switching inputs to cross bar switching outputs during a data cell time slot interval.

* * * * *